United States Patent [19]

Ruf

[11] 4,407,258
[45] Oct. 4, 1983

[54] IGNITION AND FUEL INJECTION PULSE GENERATING SYSTEM FOR ODD-NUMBERED MULTI-CYLINDER INTERNAL COMBUSTION ENGINE

[75] Inventor: Walter Ruf, Schwieberdingen, Fed. Rep. of Germany

[73] Assignee: Robert Bosch GmbH, Stuttgart, Fed. Rep. of Germany

[21] Appl. No.: 318,460

[22] Filed: Nov. 5, 1981

[30] Foreign Application Priority Data

Dec. 4, 1980 [DE] Fed. Rep. of Germany ....... 3045716

[51] Int. Cl.$^3$ ............................................. F02P 5/00
[52] U.S. Cl. .................................. 123/617; 123/650; 123/414; 123/612
[58] Field of Search ............... 123/612, 613, 614, 615, 123/616, 617, 414, 650, 652

[56] References Cited

U.S. PATENT DOCUMENTS

| | | | |
|---|---|---|---|
| 3,552,367 | 1/1971 | Slitti, Jr. et al. | 123/617 |
| 3,916,863 | 11/1975 | Hohne et al. | 123/617 |
| 3,989,023 | 11/1976 | Flozio et al. | 123/617 |
| 4,250,846 | 2/1981 | Menard | 123/414 |
| 4,373,486 | 2/1983 | Nichols et al. | 123/617 |

Primary Examiner—Parshotam S. Lall
Attorney, Agent, or Firm—Frishauf, Holtz, Goodman & Woodward

[57] ABSTRACT

Ignition control pulses as well as fuel injection control pulses can be obtained from a single signal generator structure by providing two generator units (28, 29) on the structure (1) which includes a rotating shield, vane or gate element (20) to generate by magnetic, for example Hall generator elements, or optical couplers, pulses (U28, U29). The vanes are so positioned, and the rotation thereof, at half engine speed, so arranged that the pulses (U28) generated by the first generator (28) extend over the pulse gaps or intervals of the pulses (U29) from the second pulse generator (29). At least one, and for example two vanes are foreshortened, so that the pulse generated by the first signal generator (28), upon passage of the foreshortened vane (23, 26) commences only when part of the pulse gaps of the second generator (29) has already elapsed. The pulse is applied to an OR-function gate which, then, will provide the fuel injection pulses; the trailing flanks of the pulses from the first signal generator are applied to control the ignition pulses, for example through a frequency divider (43). The number of vanes (22, 23 ... 27) is twice the number of cylinders (in the example: three).

5 Claims, 2 Drawing Figures

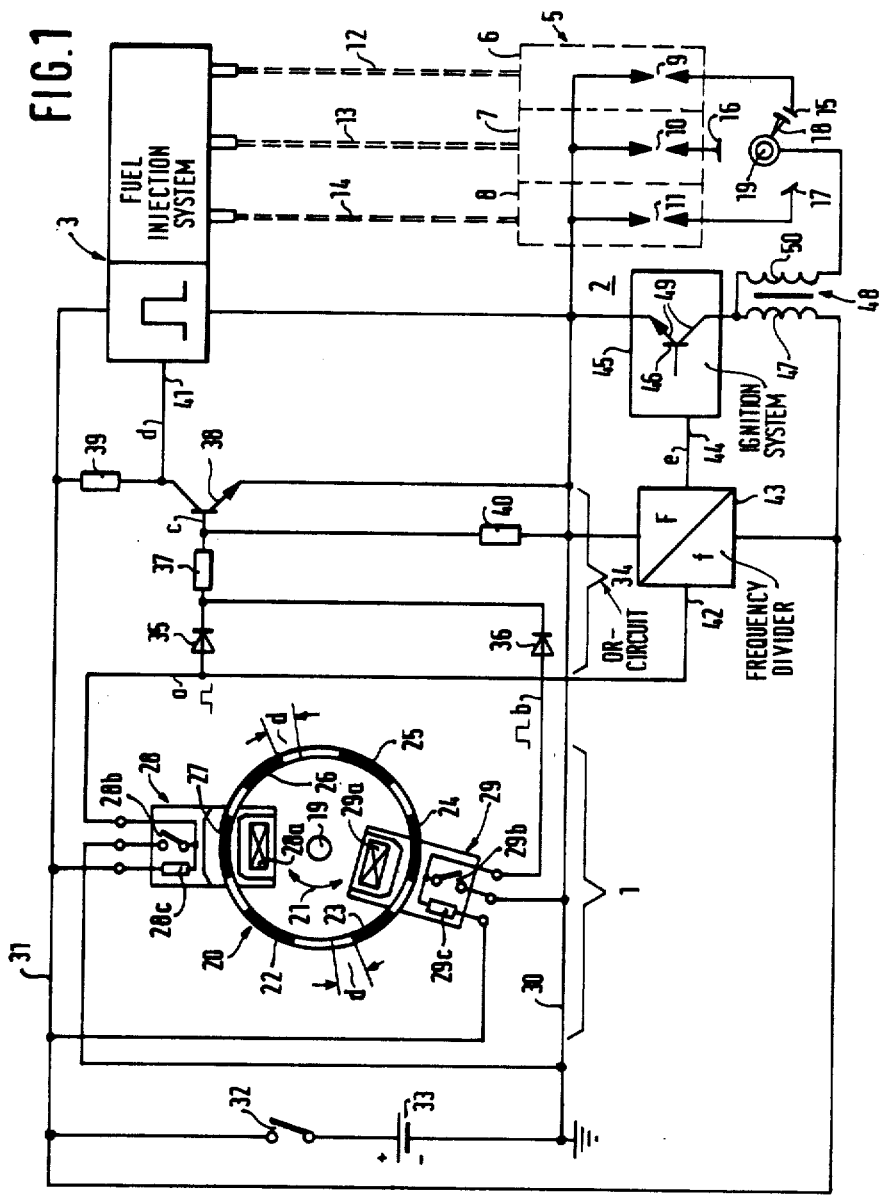

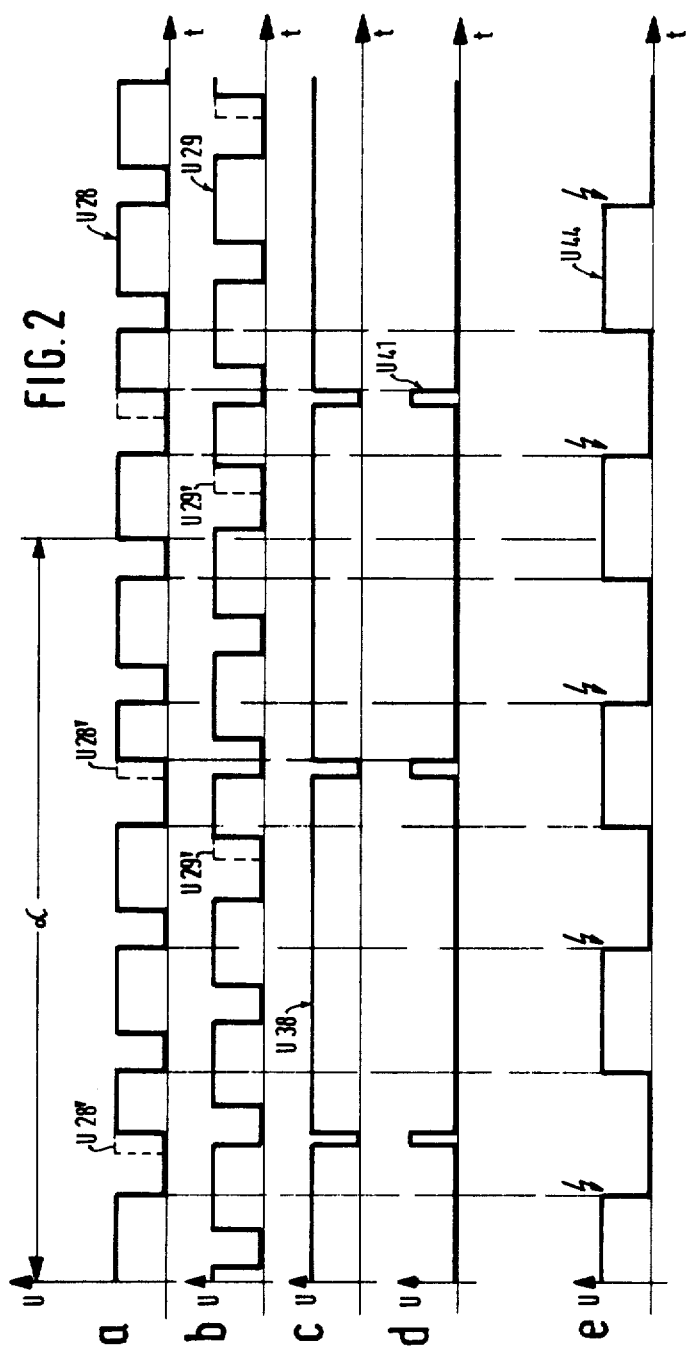

IGNITION AND FUEL INJECTION PULSE GENERATING SYSTEM FOR ODD-NUMBERED MULTI-CYLINDER INTERNAL COMBUSTION ENGINE

Reference to related patent and literature: U.S. Pat. No. 3,861,370. "Hütte", Ingenieur-Taschenbuch, 28th Edition, Maschinenbau, Part A, Berlin, 1954, published by Wilhelm Ernst & Sohn, page 798. ("Hütte", Engineer's Handbook, Machine Construction).

The present invention relates to a signal generating system, and more particularly to a system and apparatus to generate pulses which can control both sparking of spark plugs and injection of fuel of a fuel injection system in a multi-cylinder internal combustion (IC) engine, in which an odd number of cylinders is present.

BACKGROUND

Various types of four-stroke internal combustion (IC) engines are known; one such engine is described for example in the referenced publication "Hütte", Engineer's Handbook. Signal sources, such as signal transducers and the like, which provide electrical control signals for an electronic ignition control system usually have been designed for use with an even number of cylinders. Such systems, which are readily available for an even number of cylinders, cannot be easily modified to also provide control pulses for a fuel injection system. One type of such a signal generator is described in the referenced U.S. Pat. No. 3,861,370; this signal source cannot be easily adapted to be used with a four-stroke IC engine having an odd number of cylinders to provide output pulses which are suitable for the control of both ignition events and fuel injection events, since a greater number of ignition events have to be controlled than the fuel injection events, and the respective timing of the control pulses controlling ignition or fuel injection, respectively, is different.

THE INVENTION

It is an object to provide a control pulse generating system, and transducer therefor, which provides control pulses which can be useful to trigger ignition as well as fuel injection pulses, and capable of being used with an odd number of cylinders in a four-stroke engine, and which, in spite of the multiple pulse-type output, is simple in construction and reliable in operation.

Briefly, a rotor is provided which has a plurality of blocking vanes or gates, separated by vane or gate gaps or openings, which, respectively, cooperate with two signal generators which, respectively, provide first and second output signals in dependence on whether the signal generator is opposite a vane or gate or an opening. The rotor rotates at half the speed as the engine, and the number of vanes is twice the number of cylinders of the engine. The vanes and the generators, respectively, are positioned and so dimensioned that first pulses generated by the first generator extend over, that is, overlap, the pulse gap of the second pulses from the second generator. At least one of the vanes, and preferably two, for example, have the leading edge—with respect to the direction of rotation of the rotor—foreshortened by a predetermined dimension, so that the pulse generated by the first signal generator, upon passage of the foreshortened vane, will commence only when part of the pulse gap of the second signal from the second generator has already elapsed. The pulses, after suitable processing, are applied to an OR-function gate to provide the fuel injection pulses as a function of the overlap of the pulse gaps; the first pulses from the first generator, additionally, are supplied to an ignition control system to control triggering of an electronic control switch to generate an ignition event.

The system is simple, requires few electronic components, and those which are used are of high reliability and of simple construction; and permits control of multi-cylinder IC engines, for example a three-cylinder or five-cylinder engine, to generate both ignition control and fuel injection control pulses, both derived from a single pulse source structure rotating in synchronism with the crankshaft of the engine.

DRAWINGS

FIG. 1 is a schematic circuit diagram of the system in accordance with the present invention; and FIG. 2, in graphs a to e, shows—in vertical alignment—pulses arising in the system with respect to a time axis (abscissa).

A signal generator 1—see FIG. 1—is provided to generate control pulses to trigger ignition of an ignition system 2 and further to trigger fuel injection of a fuel injection system 3. The ignition system 2 and the fuel injection system 3 are part of the engine control systems of an IC engine 5 installed, for example, in an automotive vehicle (not shown). The example selected uses a three-cylinder engine, having three cylinders 6, 7, 8, each of which has a spark plug 9, 10, 11 therein, and is connected by fuel supply lines 12, 13, 14 to the fuel injection system 3. The spark plugs 9, 10, 11 are, respectively, connected to terminals 15, 16 and 17 of a rotating distributor rotor 18, which is coupled to a shaft 19 and rotated thereby, the shaft 19 being the distributor shaft usually present in the vehicle. A rotor 20—shown separately—is also secured to the distributor shaft 19, the rotor 20 forming part of the signal source 1. For ease of illustration, the rotor 20 and the distributor rotor 18 has been spatially separated; in a usual construction, they would be superimposed, with the shaft 19 extending through the entire distributor—breaker or rotor assembly.

The gearing of shaft 19 is so selected that shaft 19 of the distributor—breaker operates at half the speed as the crankshaft of the IC engine. A full revolution of shaft 19 is schematically shown in FIG. 2 by the angle α.

Looked at in the direction of arrow 21, indicating the direction of rotation of shaft 19 and hence of rotor 20, the rotor 20 is formed with a group of gates or vane portions 22, 23, 24, 25, 26, 27. These vanes are coupled to two signal generators; a first signal generator 28, and a second signal generator 29. As can be seen, the rotor 20, with respect to the number of cylinders present, has twice the number of vanes or gate portions; the signal generators 28, 29 may be Hall generators (see, for example, the referenced U.S. Pat. No. 3,861,370) or, for example, optical transducers. If constructed when utilizing Hall generators, the vanes 22, 23 . . . 27 are made of magnetically conductive material. As these vanes pass the Hall generators 28a, 29a, magnetic flux from a magnet (not shown) to the respective Hall generator 28a, 29a is inhibited, so that the switching path thereof, shown separately and outside of the rotor 20 at 28b, 29b is caused to change to blocked or switch-open condition. The switching paths 28b, 29b include, for example, the emitter-collector paths of transistors, not separately shown, and which preferably are part of pulse processing and generating stages within the signal generators 28, 29, and integrated with the respective Hall generators 28a, 29a to form a single integrated structural unit therewith. The switching path 28b is connected to a negative supply bus 30 and over a current limiting resistor 28c with a positive supply bus 31. The negative supply bus 30 may, for example, be the ground or chassis connection of the vehicle. The switching path 29d of the signal generator 29 is connected to the negative bus 30 and, with its other terminal, over current limiting resistor 29c to positive bus 31. The buses 30, 31 are, respectively, connected to the negative and positive terminals of a source of electrical power, typically a vehicle battery 33, with a control switch 32 serially connected therein.

The vanes or magnetic gate portions or vanes 23, 26 are foreshortened by a predetermined distance d in the direction of rotation indicated by arrow 21—see FIG. 1.

The signal generators 28, 29 are both connected to an OR-function circuit 34. The junction between the switching path 28b and the dropping resistor 28c is connected to the anode of a diode 35. The junction between the switching path 29b and the dropping resistor 29c of the second generator 29 is connected to the anode of a diode 36. The cathodes of diodes 35, 36 are connected together and over a current limiting and coupling resistor 37 to the base of an npn transistor 38, the emitter of which is connected to the negative bus 30 and the collector through a collector resistor 39 with positive bus 31. Transistor 38, further, has its base connected over a coupling resistor 40 to negative bus 30. The collector of transistor 38 is connected by line 41 to the fuel injection system 3. The fuel injection system 3 receives operating power from the buses 30, 31.

The connection from the signal generator 28 to the anode of diode 35 is further continued by line 42 to provide ignition pulses; line 42, to this end, is connected to a frequency divider 43 which, likewise, receives its operating power from buses 30, 31. The output of frequency divider 43 is connected to the control input 44 of an electronic ignition pulse generator 45, which may be of any well known construction of an electronic ignition system. The electronic ignition system includes a switching transistor 46 connected with its emitter-collector path serially to the primary winding 47 of an ignition coil 48, the secondary 50 of which is connected to the center terminal of the distributor 18. The emitter of the switching transistor 46, forming the control or breaker for the ignition system, is connected to negative bus 30, and the primary 47 of the coil 48 to the positive bus 31.

Operation, with reference to FIG. 2: In the example selected, it is necessary that for each full revolution of shaft 19, three ignition events are triggered, but only two fuel injection pulses are derived, and that the ignition timing as well as the fuel injection timing instants are different.

As illustrated in FIG. 1, the vane or gate section 27 just passes the signal generator 28, and the switching path 28b, consequently, is blocked. A positive pulse is applied over diode 35. Pulses from diode 35 are illustrated in graph a of FIG. 2.

When a vane or gate portion, for example vane or gate portion 24, passes the signal generator 29, the switching path 29b becomes blocked, causing a positive pulse to be applied over resistor 29c to the diode 36. Pulses from the signal generator 29 are shown as pulses U29 in graph b of FIG. 2. The pulses are also identified in FIG. 1 by the same letters as the graph letters of FIG. 2.

In accordance with a feature of the invention, the position, structure, and movement of the rotor 20, relative to the signal generators 28, 29, are so selected that, under normal conditions, a pulse U28 from the first signal generator 28 extends over a pulse gap or pulse interval of the second pulses U29 from the second signal generator 29. The vane or gate portions 23, 26 are foreshortened by the amount d at their leading edge—with respect to the direction of rotation—and thus the pulses generated from the first signal generator 28 will start only if already a pulse portion of the pause of the second pulses U29 has elapsed. This is seen in the broken-line portions U28' in graph a, and, likewise, U29' in graph b of FIG. 2. At that time, no voltage is effective or applied to the diodes 35, 36, so that control voltage to the base of the transistor 38 (FIG. 1) likewise fails. The pulses applied to the base of transistor 38, therefore, are shown as voltage pulses U38 in graph c of FIG. 2. The foreshortening is ineffective with respect to overlap of the pulses themselves, as seen by comparing the pulses U29' and pulses 28, graphs a and b of FIG. 2. Since the transistor 38 will be blocked, a positive pulse U41—see graph d of FIG. 2—will be applied to the input of the fuel injection system 3, consequently causing triggering a fuel injection event, for example to supply fuel for the next occurring fuel injection event, the timing and duration of which can be controlled by external parameters, in accordance with the particular type of fuel injection system employed.

Ignition events are triggered by the trailing flank of every other pulse generated by the pulse generator 38. The frequency of the pulses is divided by 2 in the frequency divider 43 which provides on line 44 the control pulses for the ignition system 45. These pulses are shown in graph e in FIG. 2 as pulses U44. The trailing flank of the pulses supplied by the frequency divider 43 to the ignition system 45 causes change of the electronic switch 49 from conductive to blocking state, and thus interruption of current through the primary winding 47 of the ignition coil and a high-voltage pulse in the secondary providing power for a spark in the spark plug in accordance with the rotation of the distributor 18.

The invention is not limited to Hall generators, but may be used with any other suitable transducer or signal generator, for example optically-electronically operating signal generators.

The overlap of the pulse gaps or intervals, see FIGS. 2a, 2b, which, then, result in the pulses U38, U41, can also be used as reference signals to control other control systems, for example as a reference marker or reference time for the ignition system 45; such reference markers or reference pulses are suitable in controlling ignition advance/retardation, dwell angle of current flow, and the like. Further, they can be used to provide speed-dependent output signals, for example by counting the pulses with respect to a given clock frequency. Of course, the trailing flank of the signal U44 may, likewise, be used for this purpose.

If only one pulse is to be derived for each revolution of the shaft 19, then only one of the vanes or gates of the rotor 20 need be foreshortened; by suitable selection and placement of the foreshortening of respective vanes, various types of signals can be derived at the base of transistor 38, or on line 41, respectively, with respect to the signals at line 44.

Various changes and modifications may be made within the scope of the inventive concept.

I claim:

1. For combination with an internal combustion engine (5) having an odd number of cylinders,
a control pulse generating system to provide
(a) ignition control pulses for spark plugs (9, 10, 11) of the engine (5), and
(b) fuel injection control pulses for a fuel injection system (3),
in which a larger number of ignition control pulses (U44) than fuel injection pulses (U41) are required for application to the engine, and the timing of said ignition control pulses and of said fuel injection pulses is different,
said control pulse generating system having a drive shaft (19) coupled to the engine (5) rotating in synchronism therewith at half engine speed,
and comprising, in accordance with the invention,
a signal generator (1) including
a rotor (20) having a plurality of blocking vane or gate portions (22, 23, 24, 25, 26, 27) separated by vane gaps or openings,
a first signal generator unit (28) and a second signal generator unit (29), each unit being positioned to be selectively covered by the vanes or gates, or left uncovered by the vane gaps or intervening openings, and generating pulses (U28, U29) corresponding to coverage of the respective generator unit by said vane;
wherein the number of vanes is twice the number of cylinders of the engine (5);
the position, and the dimension, and the rotation of the rotor, relative to the generators, are so arranged and selected that the first pulses (U28) generated by the first generator (28) extend over the pulse gaps of the second pulses (U29) from the second generator (29);
at least one vane (23, 26) having its leading edge—with respect to the direction of rotation of the rotor—foreshortened by a dimension (d) so that the pulse generated by the first signal generator (28), upon passage of the foreshortened vane or gate (23, 26) commences only when part of the pulse gap of the second generator (29) has already elapsed;
an OR-function gate (34), having the first and second pulses from the first and second pulse generator (28, 29) applied thereto and providing said fuel injection control pulses (U41) as a function of the overlap of the pulse gaps of the pulses applied to the OR-function gate (34);
and circuit means (42, 43) responsive to the trailing flanks of the pulses from one (28) of said pulse generators (28, 29) for providing said ignition control pulses (U44).

2. Pulse generating system according to claim 1, wherein the circuit means (42, 43) for providing said ignition control pulses are responsive to the trailing flanks of said first pulse generator (28).

3. Pulse generating system according to claim 1, wherein the circuit means for providing said ignition control pulses include a frequency divider (43).

4. Pulse generating system according to claim 1 or 2, wherein said signal generator units are Hall generators, and said vanes or gates comprise magnetic flux control elements.

5. Pulse generating system according to claim 1 or 2, wherein said signal generator units comprise optical-electrical generators, and the vanes or gates are light path control elements.

* * * * *